United States Patent
Lee et al.

(10) Patent No.: US 10,539,818 B2
(45) Date of Patent: Jan. 21, 2020

(54) DISPLAY DEVICE

(71) Applicant: Samsung Display Co. Ltd., Yongin-si, Gyeonggi-do (KR)

(72) Inventors: Keun Ho Lee, Hwaseong-si (KR); Jin Soo Shin, Suwon-si (KR); Wee Joon Jeong, Seongnam-si (KR); Min Gwan Hyun, Yongin-si (KR)

(73) Assignee: SAMSUNG DISPLAY CO., LTD., Gyeonggi-Do (KR)

(*) Notice: Subject to any disclaimer, the term of this patent is extended or adjusted under 35 U.S.C. 154(b) by 0 days.

(21) Appl. No.: 16/126,700

(22) Filed: Sep. 10, 2018

(65) Prior Publication Data

US 2019/0155088 A1  May 23, 2019

(30) Foreign Application Priority Data

Nov. 21, 2017  (KR) .................. 10-2017-0155829

(51) Int. Cl.
| | |
|---|---|
| G06F 1/16 | (2006.01) |
| G02F 1/1333 | (2006.01) |
| G02F 1/1335 | (2006.01) |
| G02F 1/1339 | (2006.01) |
| F21V 8/00 | (2006.01) |

(52) U.S. Cl.
CPC ...... *G02F 1/133308* (2013.01); *G02F 1/1339* (2013.01); *G02F 1/133524* (2013.01); *G02F 1/133602* (2013.01); *G02B 6/0025* (2013.01); *G02F 2001/133314* (2013.01); *G06F 1/16* (2013.01)

(58) Field of Classification Search
None
See application file for complete search history.

(56) References Cited

U.S. PATENT DOCUMENTS 8,289,232 B2 * 10/2012 Kobayashi ................ G09F 9/33
                                                                 345/204
8,550,689 B2 * 10/2013 Han ....................... G02B 6/0068
                                                                 362/632

(Continued)

FOREIGN PATENT DOCUMENTS

| JP | 2007072083 A | 3/2007 |
|---|---|---|
| JP | 2011027946 A | 2/2011 |

(Continued)

*Primary Examiner* — Courtney L Smith
*Assistant Examiner* — Rashen E Morrison
(74) *Attorney, Agent, or Firm* — Cantor Colburn LLP

(57) ABSTRACT

A display device includes: a display panel; a light guide plate which guides light to the display panel including first and second side surfaces opposite to each other; a light source module disposed along the first side surface of the light guide plate; a mold frame disposed along the second side surface of the light guide plate; a bottom chassis which accommodates the light source module, the mold frame and the light guide plate, including a first sidewall facing the first side surface of the light guide plate and an extension portion which extends from the first sidewall to overlap an upper surface of the light guide plate; a first adhesive member disposed between the extension portion and the display panel; and a second adhesive member overlapping an upper surface of the light guide plate and an upper surface of the mold frame.

20 Claims, 10 Drawing Sheets

(56) References Cited

U.S. PATENT DOCUMENTS

| | | | | |
|---|---|---|---|---|
| 2008/0316116 A1* | 12/2008 | Hobson | ................ | H01Q 1/243 |
| | | | | 343/702 |
| 2015/0131023 A1* | 5/2015 | Kim | ................ | G02F 1/133308 |
| | | | | 349/58 |
| 2015/0351261 A1* | 12/2015 | Lee | .................. | G02F 1/1333 |
| | | | | 361/679.01 |

FOREIGN PATENT DOCUMENTS

| | | |
|---|---|---|
| JP | 2012123338 A | 6/2012 |
| KR | 1020130020982 A | 3/2013 |
| KR | 1020160039028 A | 4/2016 |

\* cited by examiner

DISPLAY DEVICE

This application claims priority to Korean Patent Application No. 10-2017-0155829, filed on Nov. 21, 2017, and all the benefits accruing therefrom under 35 U.S.C. § 119, the content of which in its entirety is herein incorporated by reference.

BACKGROUND

1. Field

The present invention relates to a display device.

2. Description of the Related Art

With the development of multimedia, display devices are becoming increasingly important. Accordingly, various types of display devices such as liquid crystal displays ("LCDs") and organic light-emitting diode displays ("OLEDs") are being used.

Of these display devices, LCDs are one of the most widely used types of flat panel displays. An LCD includes a pair of substrates having field generating electrodes, such as pixel electrodes and a common electrode, and a liquid crystal layer interposed between the two substrates. The LCD displays images by applying voltages to the field generating electrodes to generate an electric field in the liquid crystal layer which determines the direction of liquid crystal molecules in the liquid crystal layer to adjust polarization of incident light to display the images.

The LCD includes a display panel which displays an image and a backlight unit which provides light to the display panel.

SUMMARY

Exemplary embodiments of the invention provide a slimmer display device.

Exemplary embodiments of the invention also provide a display device which can reduce or effectively prevent light leakage even without a mold frame at a light incident portion of the display device.

Exemplary embodiments of the invention also provide a display device including a back cover having a relatively simple coupling structure.

However, the invention is not restricted to the exemplary embodiments set forth herein. The above and other features of the invention will become more apparent to one of ordinary skill in the art to which the invention pertains by referencing the detailed description of the invention given below.

According to an exemplary embodiment, there is provided a display device including: a display panel which displays an image with light; a light guide plate which guides the light to the display panel, the light guide plate including a first side surface through which the light is incident to the light guide plate and a second side surface which is opposite to the first side surface; a light source module which is disposed along the first side surface of the light guide plate; a mold frame which is disposed along the second side surface of the light guide plate, the mold frame being open in a direction toward the light source module at the first side surface of the light guide plate; a bottom chassis in which is accommodated the light source module, the mold frame and the light guide plate, the bottom chassis including a first sidewall facing the first side surface of the light guide plate and an extension portion which extends from the first sidewall to overlap an upper surface of the light guide plate at the first side surface thereof; a first adhesive member which is disposed between the display panel and the extension portion of the bottom chassis, at the first side surface of the light guide plate; and a second adhesive member which overlaps an upper surface of the light guide plate and an upper surface of the mold frame.

According to another exemplary embodiment, there is provided a display device including: a display panel which displays an image with light; a light guide plate which guides the light to the display panel, the light guide plate including: an upper surface facing the display panel and through which light exits from the light guide plate, a lower surface opposite to the upper surface, and first through fourth side surfaces each connecting the upper and lower surfaces to each other; a light source disposed in plurality along the first side surface of the light guide plate; a mold frame on which the display panel is supported, the mold frame being disposed along the second side surface which is opposite to the first side surface of the light guide plate, along the third and fourth side surfaces of the light guide plate which are opposite to each other, and disconnected at the first side surface of the light guide plate; a bottom chassis in which is accommodated the light source module, the mold frame and the light guide plate, the bottom chassis including a first sidewall facing the first side surface of the light guide plate and an extension portion which extends from the first sidewall toward the second side surface of the light guide plate; a first adhesive member which directly contacts the display panel and an upper surface of the extension portion of the bottom chassis, at the first side surface of the light guide plate, to fix the display panel to the extension portion; and a second adhesive member which directly contacts the mold frame and the display panel at the second through fourth side surfaces of the light guide plate, to fix the mold frame to the display panel.

BRIEF DESCRIPTION OF THE DRAWINGS

These and/or other features will become apparent and more readily appreciated from the following description of the embodiments, taken in conjunction with the accompanying drawings in which.

DETAILED DESCRIPTION

Figure 1:
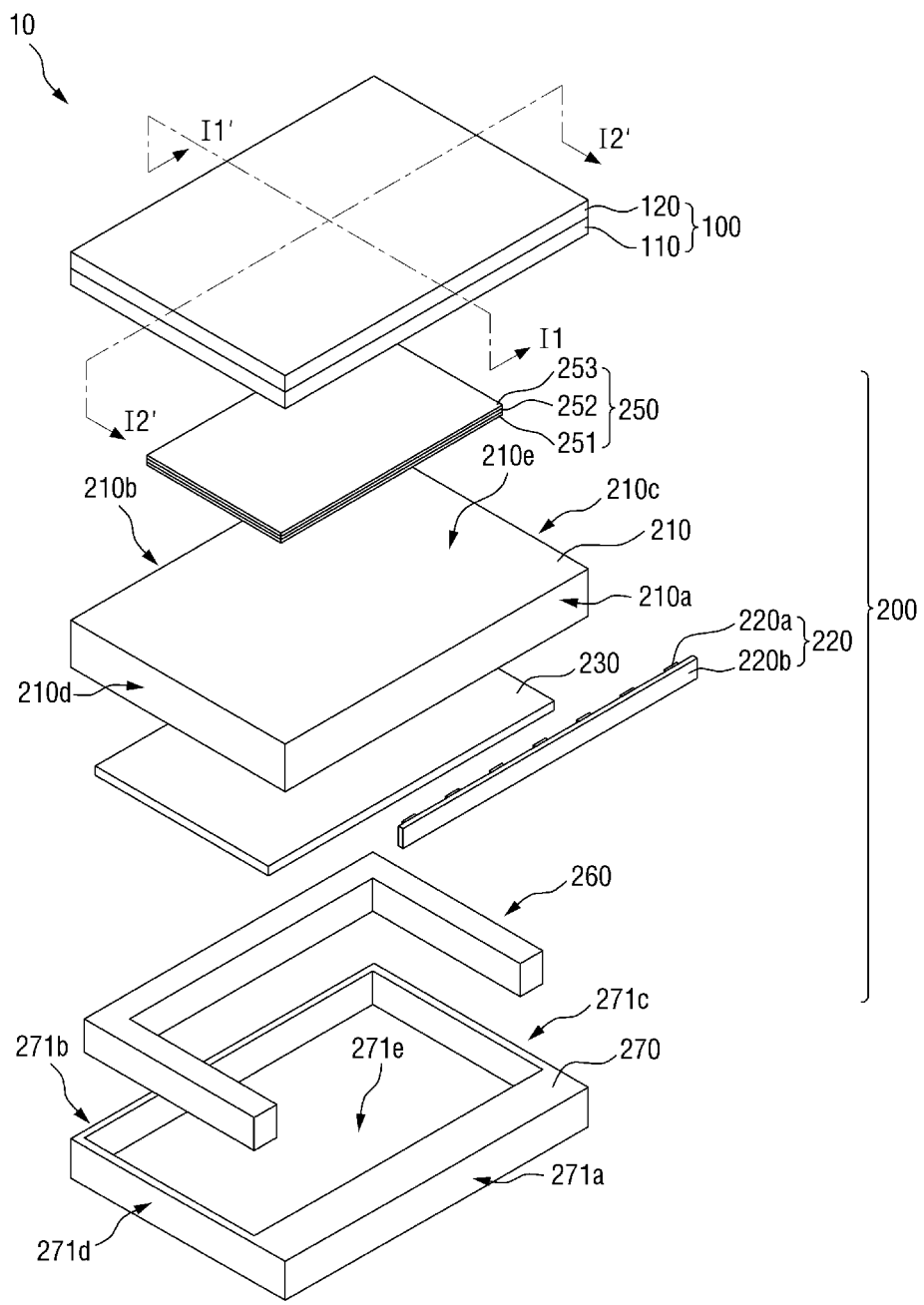
FIG. 1 is an exploded perspective view of an exemplary embodiment of a display device according to the invention.

In the following description, for the purposes of explanation, numerous specific details are set forth in order to provide a thorough understanding of various exemplary embodiments. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments.

In the accompanying figures, the size and relative sizes of layers, films, panels, regions, etc., may be exaggerated for clarity and descriptive purposes. Also, like reference numerals denote like elements.

When an element or layer is referred to as being related to another element such as being "on," "connected to" or "coupled to" another element or layer, it may be directly on, connected to or coupled to the other element or layer or intervening elements or layers may be present. When, however, an element or layer is referred to as being related to another element such as being "directly on," "directly connected to" or "directly coupled to" another element or layer, there are no intervening elements or layers present.

For the purposes of this disclosure, "at least one of X, Y, and Z" and "at least one selected from X, Y, and Z" may be construed as X only, Y only, Z only, or any combination of two or more of X, Y, and Z, such as, for instance, XYZ, XYY, YZ, and ZZ.

Although the terms first, second, etc. may be used herein to describe various elements, components, regions, layers, and/or sections, these elements, components, regions, layers, and/or sections should not be limited by these terms. These terms are used to distinguish one element, component, region, layer, and/or section from another element, component, region, layer, and/or section. Thus, a first element, component, region, layer, and/or section discussed below could be termed a second element, component, region, layer, and/or section without departing from the teachings of the present disclosure.

Spatially relative terms, such as "beneath," "below," "lower," "above," "upper" and the like, may be used herein for descriptive purposes, and, thereby, to describe one element or feature's relationship to another element(s) or feature(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. As used herein, the term "and/or" includes any and all combinations of one or more of the associated listed items. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof.

Various exemplary embodiments are described herein with reference to sectional illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not be construed as limited to the particular illustrated shapes of regions, but are to include deviations in shapes that result from, for instance, manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the drawings are schematic in nature and their shapes are not intended to illustrate the actual shape of a region of a device and are not intended to be limiting.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense, unless expressly so defined herein.

Hereinafter, exemplary embodiments will be described with reference to the accompanying drawings.

Figure 2:
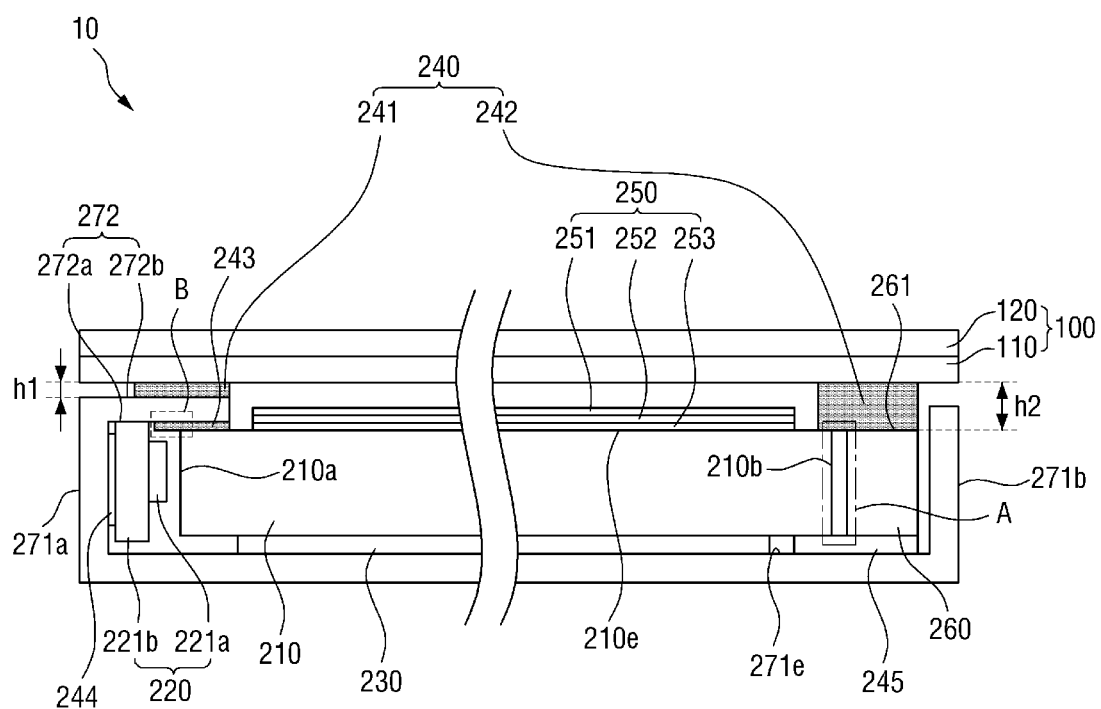
FIG. 2 is a cross-sectional view taken along line I1-I1' of FIG. 1.
Figure 3:
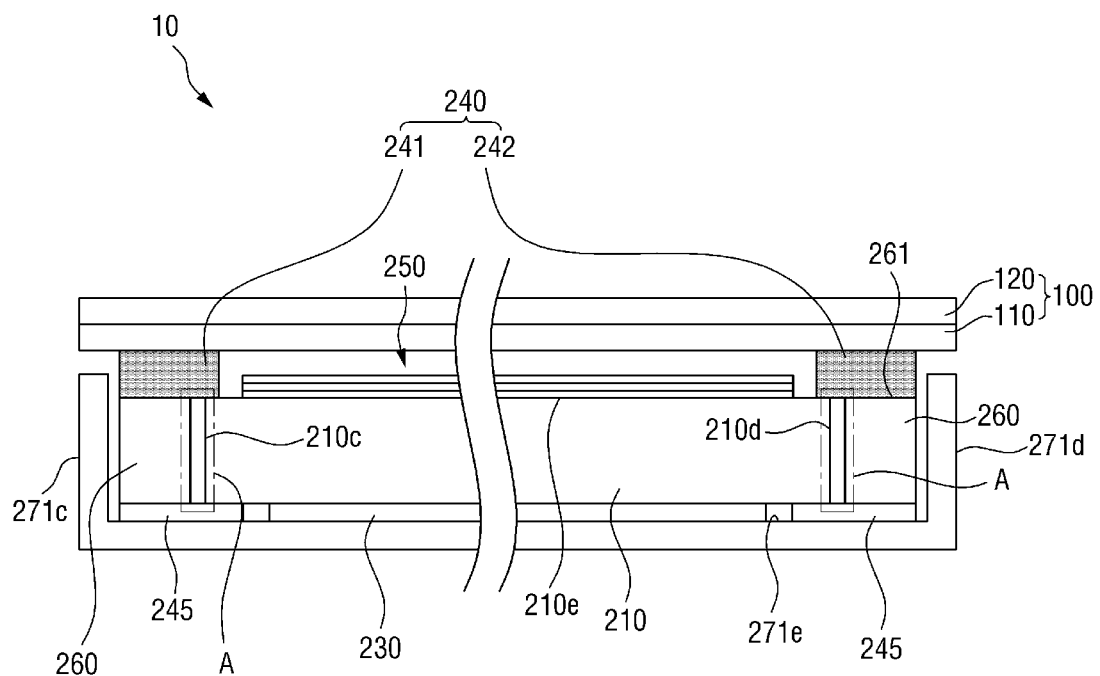
FIG. 3 is a cross-sectional view taken along line I2-I2' of FIG. 1.

FIG. 1 is an exploded perspective view of an exemplary embodiment of a display device 10 according to the invention. FIG. 2 is a cross-sectional view taken along line I1-I1' of FIG. 1. FIG. 3 is a cross-sectional view taken along line I2-I2' of FIG. 1. The terms "upper," "on," "lower" and "under" used herein are defined based on a thickness direction of the display device and components thereof, such as along a vertical direction in the view of FIG. 1, unless otherwise defined.

Referring to FIGS. 1 through 3, the display device 10 includes a display panel 100 and a backlight unit 200. The display device 10 and/or elements thereof are disposed in a plane defined by first and second directions which cross each other, e.g., horizontal directions in FIG. 2 and FIG. 3. A thickness of the display device 10 and/or elements thereof is taken along a third direction which crosses each of the first and second directions, e.g., vertical in FIGS. 1 through 3.

The display panel 100 generates and displays an image using light. The display panel 100 may be a liquid crystal display ("LCD") panel in an embodiment. However, the display panel 100 can also be employed in various forms such as a plasma display panel and an electrophoretic display panel. The display panel 100 will hereinafter be described as an LCD panel.

The display panel 100 may include a first (display) substrate 110, a second (display) substrate 120, and an optical control layer such as a liquid crystal layer (not illustrated) with which transmittance of light through the display panel 100 is controlled to display the image. The first substrate 110 and the second substrate 120 are placed to face each other. The liquid crystal layer is disposed between the first substrate 110 and the second substrate 120 and includes a plurality of liquid crystal molecules.

The display panel 100 may be disposed on the backlight unit 200. The display panel 100 may receive light from the backlight unit 200. The display panel 100 may display an image by controlling the arrangement of the liquid crystal molecules to change the path of light received from the backlight unit 200.

The backlight unit 200 may include a light guide plate 210, a light source module 220, a reflective member 230, an adhesive member 240, an optical member 250, a mold frame 260 and a bottom chassis 270. In FIG. 1, the adhesive member 240 is omitted for convenience of illustration.

The light guide plate 210 may guide light received from the light source module 220 toward the display panel 100. To this end, the light guide plate 210 may include a first (side) surface 210a, that is, an incident (side) surface which receives light from the light source module 220 and through which the light is incident to an inner area of the light guide plate 210. Hereinafter, a side of the backlight unit 200 at which the first surface 210a is located, that is, a side of the backlight unit 200 at which the light source module 220 is disposed, will be defined as a light incident portion. In addition, a side of the backlight unit 200 at which the light source module 220 is not disposed will be defined as a non-light incident portion. In FIG. 1, the non-light incident portion is defined as sides at which second through fourth (side) surfaces 210b through 210d of the light guide plate 210 are located.

The light guide plate 210 further includes an upper surface 210e which faces the display panel 100 and through which light exits from the light guide plate 210, and an opposite surface which faces the upper surface 210e. Each of the (side) surfaces 210a through 210d connects the upper surface 210e to the opposite surface of the light guide plate 210.

The light guide plate 210 may be shaped like a rectangular parallelepiped having a rectangular planar shape. In addition, a thickness of the light guide plate 210 may not be constant. In an exemplary embodiment, for example, in order to reduce the overall thickness of the backlight unit 200, the light guide plate 210 may have a shape and/or be formed such that a thickness of the light guide plate 210 at a side thereof is smaller than a thickness at a central portion of the light guide plate 210, or the thickness of the light guide plate 210 may be reduced as a distance from the light source module 220 increases. That is, the shape of the light guide plate 210 may vary according to the shape of the display panel 100, the position of the light source module 220, and the like.

The light guide plate 210 may include or be made of glass in an embodiment. However, the material of the light guide plate 210 is not particularly limited as long as the light guide plate 210 can guide light toward the display panel 100. In an exemplary embodiment, for example, the light guide plate 210 may include or be made of polycarbonate material, polysulfone material, polyacrylate material, polystyrene material, polyvinyl alcohol material, polyvinyl chloride material or polyester.

The light source module 220 may include a light source 220a provided in plurality, and a printed circuit board ("PCB") 220b on which the light source 220a is disposed. The light source 220a generates and emits light which is incident to the light guide plate 210.

The light sources 220a may be disposed adjacent to at least one side surface of the light guide plate 210. As described above, the light sources 220a may be disposed along the first surface 201a to face the first surface 210a of the light guide plate 210. In FIG. 1, the light sources 220a are disposed only on the side at which the first surface 210a of the light guide plate 210 is defined. However, embodiments are not limited to this case. That is, the light sources 220a can also be disposed along the second surface 210b opposite to the first surface 210a of the light guide plate 210.

The light sources 220a may be point light sources in an embodiment. In an exemplary embodiment, for example, the light sources 220a may be light emitting diode ("LED") light sources. However, the light sources 220a may also be line light sources, such as laser diode ("LD") light sources or lamps, or may be surface light sources.

A conductive pattern is disposed or formed on the PCB 220b. The light sources 220a may receive an electrical signal through the conductive pattern disposed or formed on the PCB 220b to generate light and may provide the light to the first surface 210a (e.g., the incident surface) of the light guide plate 210.

The light source module 220 may further include a heat dissipation member (not shown) for dissipating heat generated from the light sources 220a and/or the PCB 220b to outside thereof.

The reflective member 230 may be disposed under the light guide plate 210. More specifically, the reflective member 230 may be disposed between the light guide plate 210 and the bottom chassis 270.

The reflective member 230 may reflect light emerging from a lower surface of the light guide plate 210 back toward the light guide plate 210. The material of the reflective member 230 is not particularly limited. In an embodiment, the reflective member 230 may include or be made of a plastic material such as polyethylene terephthalate ("PET") or polycarbonate ("PC").

The adhesive member 240 will be described later.

The optical member 250 may be disposed on the light guide plate 210. More specifically, the optical member 250 may be disposed between the upper surface 210e of the light guide plate 210 and the display panel 100. The optical member 250 may, in an embodiment, include a collection of individual members such as a diffusion sheet 251, a prism sheet 252, and a protective sheet 253.

The diffusion sheet 251 may diffuse light received from the light guide plate 210 and provide the diffused light to the display panel 100. The prism sheet 252 may be disposed on the diffusion sheet 251. The prism sheet 252 may concentrate light diffused by the diffusion sheet 251 in a direction substantially perpendicular to a lower surface of the display panel 100X). To this end, the prism sheet 252 may include a plurality of prism patterns in an embodiment. The optical member 250 may further include the protective sheet 253. The protective sheet 253 may be disposed on the prism sheet 252 and protect the prism sheet 252 from foreign matter such as dust.

The mold frame 260 may be accommodated in the bottom chassis 270 which will be described later and may be placed to surround the second through fourth surfaces 210b through 210d of the light guide plate 210. The mold frame 260 is not disposed on the side at which the first surface 210a of the light guide plate 210 on which the light source module 220 is disposed. Therefore, the mold frame 260 as a whole may be in the shape of "C." That is, the mold frame 260 may be open at the side of the light guide plate 210 at which the light source module 200 is disposed. The mold frame 260 may be formed as a single piece in an embodiment, or may be formed as a combination of separately provided pieces which are assembled to each other.

The bottom chassis 270 may accommodate therein the light guide plate 210, the light source module 220, the reflective member 230 and the optical member 250. The bottom chassis 270 includes a bottom surface (portion) 271e and first through fourth sidewalls 271a through 271d each extending in a vertical direction from edges of the bottom surface 271e.

The arrangement structure of the light source module 220, the light guide plate 210, the mold frame 260 and the bottom chassis 270 will now be described.

The light source module 220 may be disposed along the first sidewall 271*a* of the bottom chassis 270. More specifically, the light source module 220 may be disposed between the first sidewall 271*a* of the bottom chassis 270 and the first surface 210*a* of the light guide plate 210.

The mold frame 260 may be disposed along the second through fourth sidewalls 271*b* through 271*d* of the bottom chassis 270. The mold frame 260 may be disconnected at the first sidewall 271*a* to expose an inner area of the mold frame 260 to the light source module 220. More specifically, the mold frame 260 may be disposed between the second through fourth sidewalls 271*b* through 271*d* of the bottom chassis 270 and the second through fourth surfaces 210*b* through 210*d* of the light guide plate 210, respectively.

That is, the light source module 220 and the mold frame 260 may together surround the light guide plate 210 in the top plan view. However, the light source module 220, the light guide plate 210, the mold frame 260, and the light guide plate 210 are not in direct contact with each other.

The bottom chassis 270 further includes an extension portion 272 which extends from an upper edge of the first sidewall 271*a*. Accordingly, a cross section of the first sidewall 271*a* and the extension portion 272 of the bottom chassis 270 may have a "C" shape. More specifically, the extension portion 272 may extend to cover an upper surface of the light source module 220 and may overlap at least a portion of the upper surface 210*e* of the light guide plate 210. In this specification, when "a first element and a second element overlap each other," it means that "the first element and the second element overlap each other in the vertical (e.g., thickness) direction based on FIG. 1," unless otherwise defined.

That is, the bottom chassis 270 completely overlaps the light source module 220 and overlaps at least a portion of the upper surface 210*e* of the light guide plate 210. Therefore, emission of light totally reflected toward the first surface 210*a* of the light guide plate 210 to the outside may be reduced or effectively prevented.

A lower surface 272*a* of the extension portion 272 of the bottom chassis 270 may directly contact the light source module 220 in an embodiment. Therefore, the extension portion 272 of the bottom chassis 270 can disperse the heat generated from the light source module 220 which is transferred to the extension portion 272 by the direct contact. Although not illustrated in the drawings, the light source module 220 may directly contact the bottom surface 271*e* of the bottom chassis 270.

The coupling relationship between the light source module 220, the light guide plate 210, the mold frame 260 and the bottom chassis 270 will be described. However, the coupling relationship between the backlight unit 200 and the display panel 100 will be described first.

The adhesive member 240 may include a first adhesive member 241 and a second adhesive member 242.

The first adhesive member 241 may be disposed between an upper surface 272*b* of the extension portion 272 and the first substrate 110 of the display panel 100. That is, the display panel 100 can be attached to the extension portion 272 of the bottom chassis 270 by the first adhesive member 241. The first adhesive member 241 may extend along the upper surface 272*b* of the extension portion 272 and may be formed as a single piece in an embodiment. In an embodiment, the first adhesive member 241 may be disposed on portions of the upper surface 272*b* of the extension portion 272 to expose other portion of the upper surface 272*b*. In this case, the first adhesive member 241 may include a plurality of discrete sub-adhesive members spaced apart from each other to expose portions of the upper surface 272*b*.

The second adhesive member 242 may be overlap the upper surface 210*e* of the light guide plate 210 and the upper surface 261 of the mold frame 260. The second adhesive member 242 may be disposed between an upper surface 261 of the mold frame 260 and the first substrate 110 of the display panel 100. That is, the display panel 100 can be attached to the upper surface 261 of the mold frame 260 by the second adhesive member 242. In addition, the second adhesive member 242 may directly contact at least a portion of the upper surface 210*e* of the light guide plate 210. Accordingly the second adhesive member 242 can fix the second through fourth surfaces 210*b* through 210*d* of the light guide plate 210, to the display panel 100.

The second adhesive member 242 may not contact the second through fourth sidewalls 271*b* through 271*d* of the bottom chassis 270 in an embodiment. However, in an embodiment, the second adhesive member 242 may directly contact the second through fourth sidewalls 271*b* through 271*d* of the bottom chassis 270.

The first adhesive member 241 and the second adhesive member 242 may include or be made of a light shielding material. Therefore, light leakage between the display panel 100 and the backlight unit 200 can be reduced or effectively prevented. More specifically, the first adhesive member 241 may block light emitted to the outside from the first surface 210*a* of the light guide plate 210. The second adhesive member 242 may block light emitted to the outside from the second through fourth surfaces 210*b* through 210*d* of the light guide plate 210. In particular, the second adhesive member 242 may block light emitted to the outside from a space A defined between the light guide plate 210 and the mold frame 260.

Since the first adhesive member 241 is disposed on the extension portion 272 extending from the first sidewall 271*a* of the bottom chassis 270, a thickness of the first adhesive member 241 may be smaller than that of the second adhesive member 242 disposed on the light guide plate 210 and the mold frame 260. That is, a thickness h2 of the second adhesive member 242 is greater than a thickness h1 of the first adhesive member 241.

Each of the first adhesive member 241 and the second adhesive member 242 is not limited to a particular type as long as adhesiveness thereof is provided relative to at least one of an upper surface and a lower surface thereof. In an embodiment, each of the first adhesive member 241 and the second adhesive member 242 may be a foam tape or a double-sided tape.

The first adhesive member 241 and the second adhesive member 242 may be formed as separate members in an embodiment or may be formed integrally with each other as a single, indivisible member in an embodiment. As being integral, a portion of one of the first adhesive member 241 and the second adhesive member 242 may extend to define the other of and the first adhesive member 241 and the second adhesive member 242. That is, the adhesive member 140 as an integral piece may include portions thereof which are connected to each other while having different thicknesses from each other.

The coupling relationship between the light source module 220, the light guide plate 210, the mold frame 260 and the bottom chassis 270 will be described.

The adhesive member 240 may further include third through fifth adhesive members 243 through 245.

The third adhesive member 243 may be disposed between the upper surface 210e of the light guide plate 210 and the extension portion 272. That is, the light guide plate 210 can be attached to the extension portion 272 of the bottom chassis 270 by the third adhesive member 243. Accordingly, the extension portion 272 of the bottom chassis 270 can fix the first surface 210a of the light guide plate 210 within the backlight unit 200. The third adhesive member 243 may reduce or effectively prevent light leakage at a space between the upper surface 210e of the light guide plate 210 and the extension portion 272. To this end, the third adhesive member 243 may include or be made of a light shielding material.

The third adhesive member 243 may extend over to region B in FIG. 2. That is, the third adhesive member 243 may extend from a portion directly contacting the upper surface 210e of the light guide plate 210 toward the light source module 220, to be disposed further than the first surface 210a of the light guide plate 210. Accordingly, light emitted from the region B to the outside can be blocked, thereby reducing or effectively preventing light leakage.

In an alternative exemplary embodiment, different from the drawings, the upper surface 210e of the light guide plate 210 can directly contact the extension portion 272 of the bottom chassis 270. In this case, the third adhesive member 243 may be omitted.

The fourth adhesive member 244 may be disposed between the light source module 220 and the first sidewall 271a of the bottom chassis 270. That is, the light source module 220 may be attached to the first sidewall 271a of the bottom chassis 270 by the fourth adhesive member 244. In an embodiment, the fourth adhesive member 244 may be disposed between the bottom surface 271e of the bottom chassis 270 and the light source module 220 to attach the light source module 220 to the bottom chassis 270.

The fifth adhesive member 245 may be disposed between at least a portion of the lower surface of the light guide plate 210 and the bottom surface 271e of the bottom chassis 270. That is, the fifth adhesive member 245 may directly contact the lower surface of the light guide plate 210 and the bottom surface 271e of the bottom chassis 270, thereby fixing a position of the light guide plate 210. The fifth adhesive member 245 may also directly contact a bottom surface of the mold frame 260.

The type of the third through fifth adhesive members 243 through 245 is not particularly limited. Like the first and second adhesive members 241 and 242, the third through fifth adhesive members 243 through 245 may be foam tapes or double-sided tapes. In exemplary embodiments, the third through fifth bonding members 243 through 245 can be omitted.

As described above, the mold frame 260 is not disposed at the light-incident portion of the backlight unit 200. The omission of the mold frame 260 at the light-incident portion provides a reduced space of the light-incident portion, thereby reducing the overall size of the backlight unit 200. In addition, the extension portion 272 of the bottom chassis 270 is disposed at the light-incident portion of the backlight unit 200 and is coupled to the display panel 100 by the first adhesive member 241. Therefore, light leakage in the light incident portion can be reduced or effectively prevented. Furthermore, since the mold frame 260 disposed at the non-light incident portion and the display panel 100 are directly fixed to each other by the second adhesive member 242, the coupling structure of the mold frame 260 and the bottom chassis 270 can be simplified.

A display device according to modified exemplary embodiments will be described. For simplicity, a description of elements and features identical to those described above with reference to FIGS. 1 through 3 will be omitted.

Figure 4:
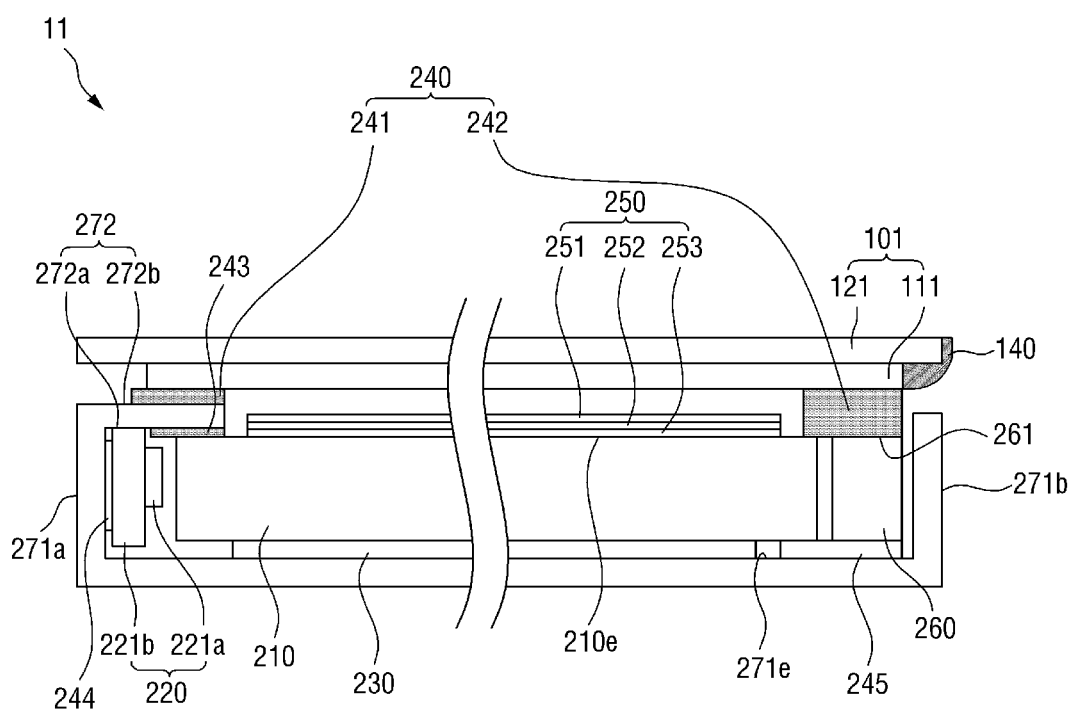
FIG. 4 illustrates a modified exemplary embodiment of the cross-section taken along line I1-I1' of FIG. 2.

FIG. 4 illustrates a modified exemplary embodiment of the cross-section taken along line I1-I1' of FIG. 2. A display device 11 illustrated in FIG. 4 is different from the display device 10 illustrated in FIG. 2 in the shape and coupling relationship of a display panel 101.

Referring to FIG. 4, the display panel 101 may include a first (display) substrate 111 and a second (display) substrate 121 having different planar areas from each other. In an embodiment, the planar area of the first substrate 111 may be smaller than the planar area of the second substrate 121. Accordingly, both of opposing ends of the second substrate 121 may protrude further than respective ends of the first substrate 111.

The display panel 101 may further include a sealing member 140. The sealing member 140 may cover ends of each of the first substrate 111 and the second substrate 121 at a same side of the display panel 101, to fix the first substrate 111 and the second substrate 121 to each other. In FIG. 4, the sealing member 140 is disposed at only one side of the display panel 101. However, embodiments are not limited to this case. In an embodiment, the sealing member 140 may be disposed at both of opposing sides of the display panel 101.

The sealing member 140 may include or be made of resin, silicone or an ultraviolet ("UV") curable-based sealing agent. The sealing member 140 may be black in an embodiment, so as to be light-blocking. However, the color of the sealing member 140 is not particularly limited as long as the sealing member 140 can reduce or effectively prevent side light leakage of the display panel 101. In an exemplary embodiment of a method of manufacturing a display device, the sealing member 140 may be formed by laser cutting or by using a zig.

That is, since the first substrate 111 and the second substrate 121 of the display panel 101 can be bonded to each other by the sealing member 140 outside end surfaces thereof, a display area of the display panel 101 can be maximized. Since a non-display area of the display panel 101 is minimized, the display panel 101 effectively does not include a bezel that forms a front frame portion of the display panel 101 at the non-display area thereof. Accordingly, the display device 11 including the display panel 101 can improve a user's screen immersion and can have an aesthetically improved design.

Figure 5:
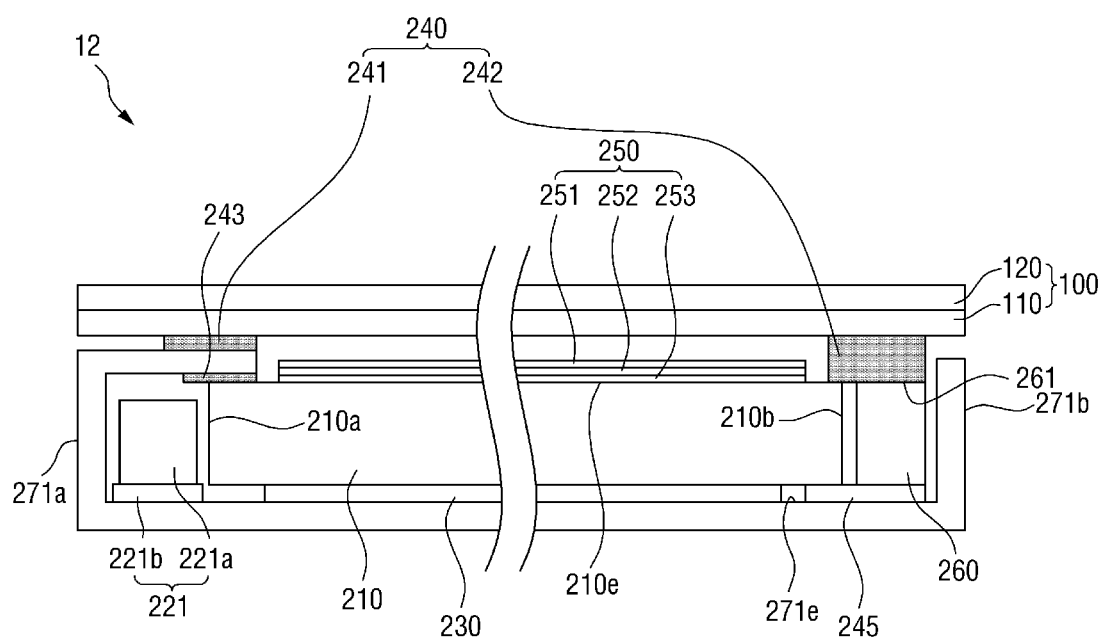
FIG. 5 illustrates another modified exemplary embodiment of the cross-section taken along line I1-I1' of FIG. 2.

FIG. 5 illustrates another modified exemplary embodiment of the cross-section taken along the line I1-I1' of FIG. 2. A display device 12 illustrated in FIG. 5 is different from the display device 10 illustrated in FIG. 2 in the position of a light source module 221.

Referring to FIG. 5, a PCB 221b may be placed to extend along a bottom surface 271e of a bottom chassis 270. A light source 221a may be disposed on the PCB 221b and may extend from the PCB 221b in a direction perpendicular to a direction in which the PCB 221b extends. That is, the light source 221a included in the display device 12 of FIG. 5 may be a side emission light source that emits light through a side thereof toward the light guide plate 210. The PCB 221b may directly contact the bottom chassis 270 to disperse the heat generated from the PCB 221b and the light source 221a.

Figure 6:
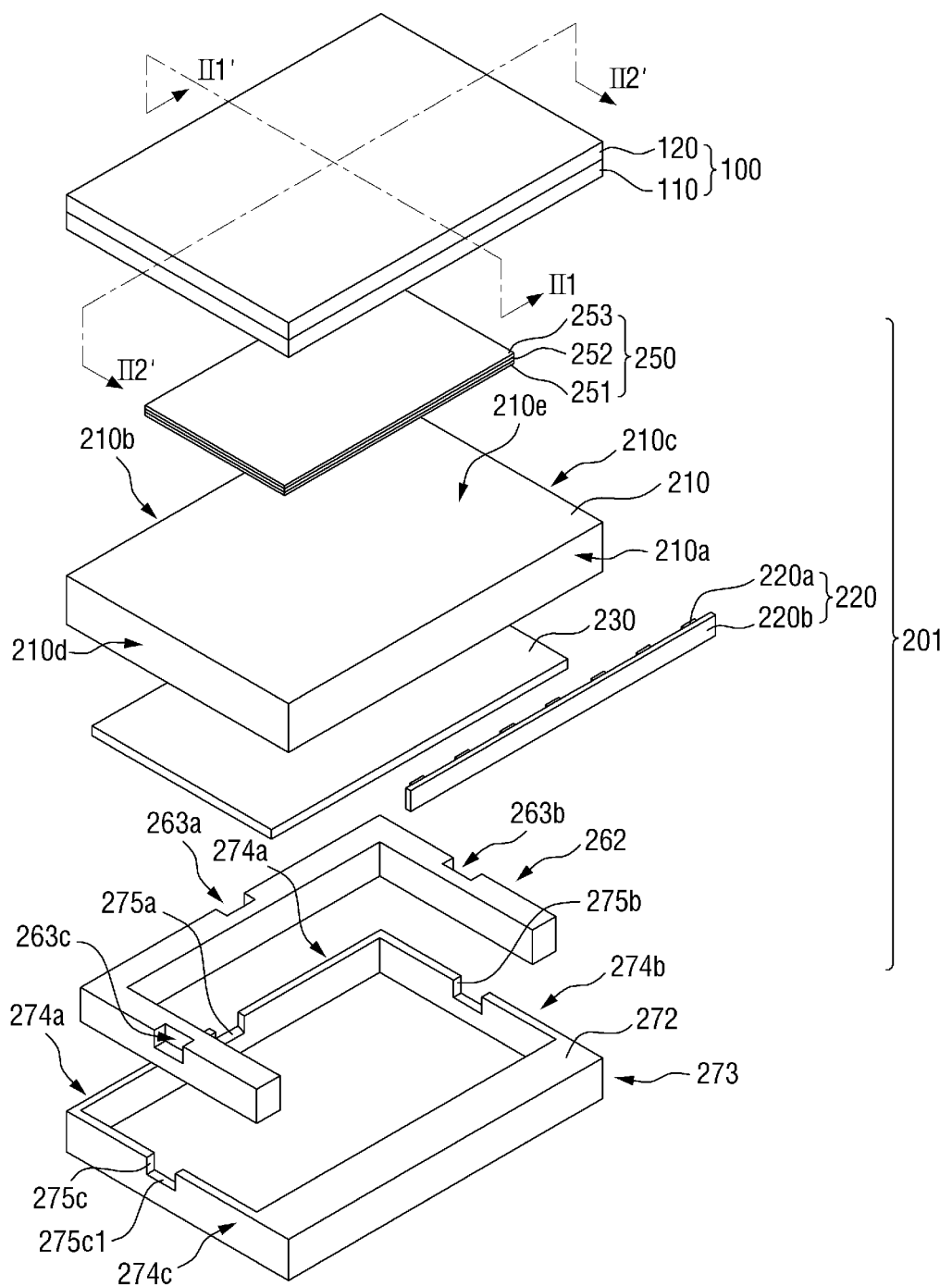
FIG. 6 is an exploded perspective view of another exemplary embodiment of a display device according to the invention.
Figure 7:
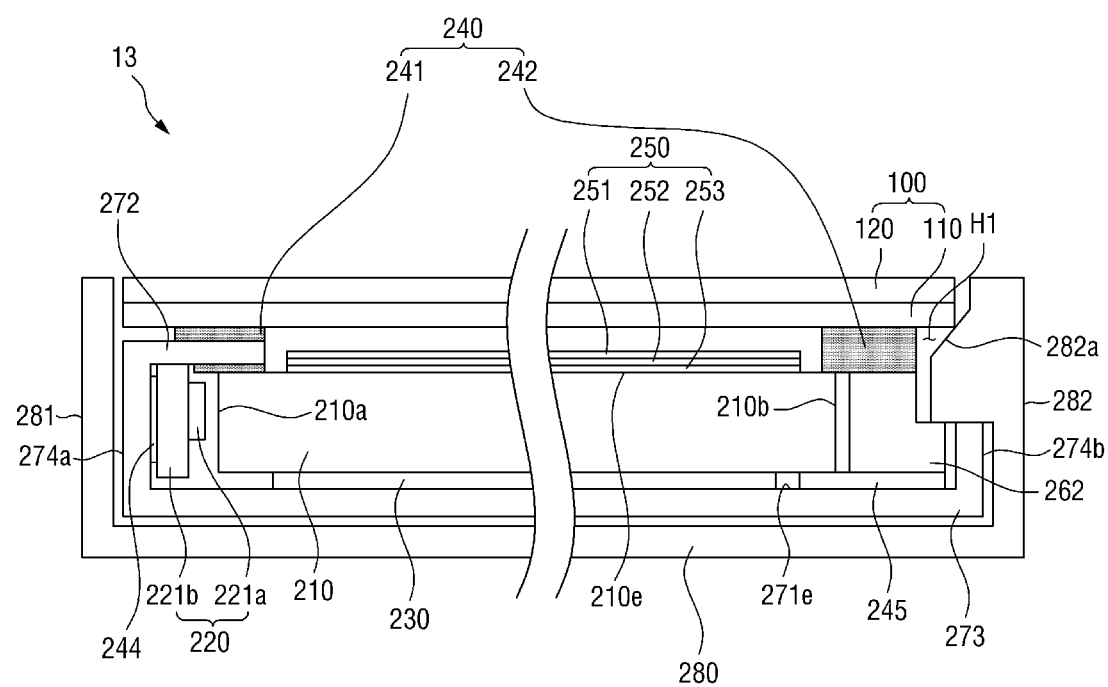
FIG. 7 is a cross-sectional view taken along line II1-II1' of FIG. 6.
Figure 8:
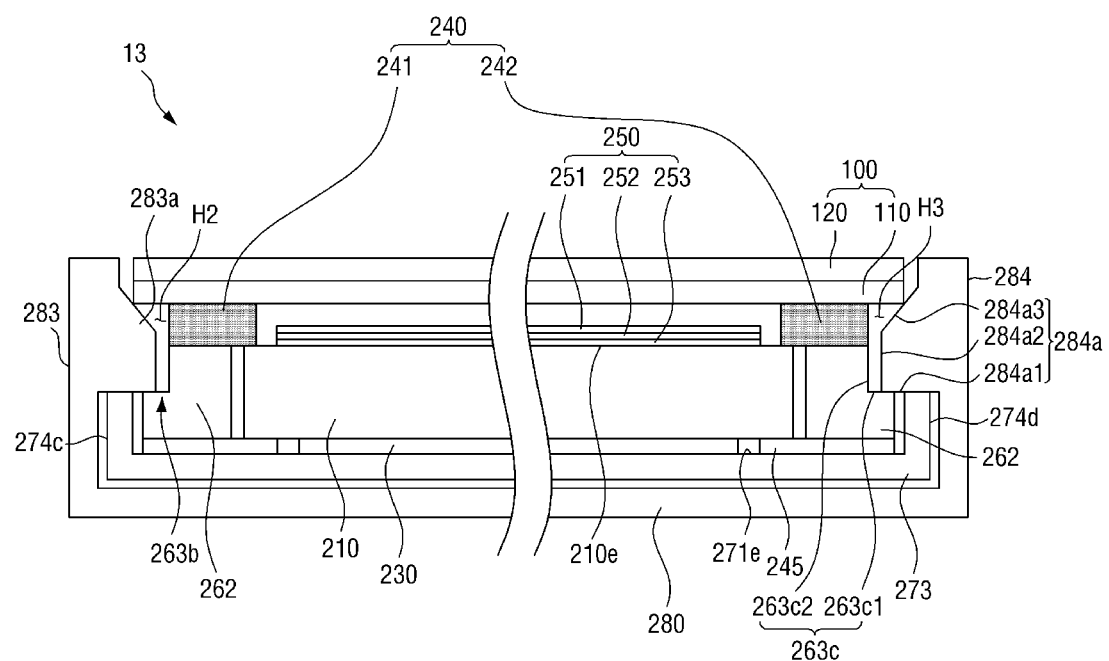
FIG. 8 is a cross-sectional view taken along line II2-II2' of FIG. 6.

FIG. 6 is an exploded perspective view of another exemplary embodiment of a display device 13 according to the invention. FIG. 7 is a cross-sectional view taken along line II1-II1' of FIG. 6. FIG. 8 is a cross-sectional view taken along line II2-II2' of FIG. 6. In the description of FIGS. 6 through 8, the terms "upper," "on," "lower" and "under" will be defined based on a thickness direction of the display device and components thereof, such as along a vertical direction in the view of FIG. 6, and a description of elements and features identical to those described above with reference to FIGS. 1 through 5 will be omitted. In addition, a back cover 280 (refer to FIGS. 7 and 8) is omitted in FIG. 6 for convenience of description.

Referring to FIG. 6, the display device 13 may further include the back cover 280.

The back cover 280 may accommodate therein a display panel 100 and a backlight unit 201. That is, the display device 13 may be finally assembled through the back cover 280. In an embodiment, the back cover 280 may be integrated with the bottom chassis 273. The back cover 280 may form an outermost element or surface of the display device 13.

More specifically, the back cover 280 may include first through fourth sidewalls 281 through 284. The first through fourth sidewalls 281 through 284 of the back cover 280 may face first through fourth sidewalls 274a through 274d of the bottom chassis 273, respectively.

The back cover 280 may include first through third coupling portions 282a through 284a The first coupling portion 282a may extend from the second sidewall 282 of the back cover 280 toward a light guide plate 210. The second coupling portion 283a may extend from the third sidewall 283 of the back cover 280 toward the light guide plate 210. The third coupling portion 284a may extend from the fourth sidewall 284 of the back cover 280 toward the light guide plate 210. The first coupling portion 282a of the back cover 280 may face a light source module 220 with respect to the light guide plate 210. In addition, the second coupling portions 283a and the third coupling portions 284a of the back cover 280 may face each other with respect to the light guide plate 210.

The first through third coupling portions 282a through 284a of the back cover 280 may be received in first through third receiving grooves H1 through H3, respectively. To this end, the second through fourth sidewalls 274b through 274d of the bottom chassis 273 may include first through third recessed portions 275a through 275c. In addition, a mold frame 262 may include first through third receiving portions 263a through 263c.

The first recessed portion 275a, the first receiving portion 263a, a second adhesive member 242 and the display panel 100 form the first receiving groove H1. The second recessed portion 275b, the second receiving portion 263b, the second adhesive member 242 and the display panel 100 form the second receiving groove H2. In addition, the third recessed portion 275c, the third receiving portion 263c, the second adhesive member 242 and the display panel 100 form the third receiving groove H3.

The respective coupling structures of the first through third coupling portions 282a through 284a of the back cover 280 and the first through third receiving grooves H1 through H3 will be described based on the third receiving groove H3 in which the third coupling portion 284a is received.

The third coupling portion 284a of the back cover 280 may include a first surface 284a1, a second surface 284a2 extending in the vertical direction from the first surface (a bottom surface) 284a1, and a third surface 284a3 extending at an angle from the second surface 284a2. The same surfaces of the third coupling portion 284a may be applied to the coupling portions 282a and 283a.

The third receiving portion 263c of the mold frame 262 may include a first surface 263c1 and a second surface 263c2 which extends from the first surface 263c1. The surfaces of the third receiving portion 263a may be applied to the receiving portions 263a and 263b.

The third recessed portion 275c of the bottom chassis 273 may include a first surface 275c1. The surface of third recessed portion 275c may be applied to recessed portions 275a and 275b.

The first surface 284a1 of the third coupling portion 284a of the back cover 280 may directly contact each of the first surface 263c1 of the third receiving portion 263c of the mold frame 262 and the first surface 275c1 of the third recessed portion 275c of the bottom chassis 273. In an embodiment, the first surface 284a1 of the third coupling portion 284a of the back cover 280, the first surface 263c1 of the third receiving portion 263c of the mold frame 262, and the first surface 275c1 of the third recessed portion 275c of the bottom chassis 273 may lie on the same line, that is, being coplanar with each other. In an alternative embodiment, the first surface 284a*l* of the third coupling portion 284a of the back cover 280 may be attached to the first surface 263c1 of the third receiving portion 263c of the mold frame 262 and the first surface 275c1 of the third recessed portion 275c of the bottom chassis 273 by an adhesive member.

The second surface 284a2 of the third coupling portion 284a of the back cover 280 may be spaced apart from the second surface 263c2 of the third receiving portion 263c of the mold frame 262 in an embodiment. In an embodiment, the second surface 284a2 of the third coupling portion 284a of the back cover 280 may directly contact the second surface 263c2 of the third receiving portion 263c of the mold frame 262.

At least a portion of the third surface 284a3 of the third coupling portion 284a of the back cover 280 may directly contact the display panel 100.

The first surface 284a1 of the third coupling portion 284a of the back cover 280 may directly contact the first surface 263c1 of the third receiving portion 263c of the mold frame 262 and the first surface 275c1 of the third recessed portion 275c of the bottom chassis 273, and the third surface 284a3 of the third coupling portion 284a of the back cover 280 may directly contact the display panel 100. Accordingly, the third coupling portion 284a of the back cover 280 may be received in the third receiving groove H3 to fix the display panel 100 and the backlight unit 201 to each other.

That is, the display panel 100 and the backlight unit 201 in the display device 13 can be coupled simply and solely by engagement of the first through third coupling portions 282a through 284a of the back cover 280 to the grooves H1 through H3.

The form, shape, size, etc. of the first through third coupling portions 282a through 284a of the back cover 280 are not limited to those illustrated in FIGS. 6 through 8 as long as the display panel 100 and the backlight unit 201 can be fixed to each other by engagement of the first through third coupling portions 282a through 284a of the back cover 280 to receiving grooves defined in the display device.

In addition, in FIGS. 6 through 8, the back cover 280 includes all of the first through third coupling portions 282a through 284a However, embodiments are not limited to this case. That is, the back cover 280 can include at least one coupling portion among the first through third coupling portions 282a through 284a in consideration of a relationship of such coupling member with other elements of the display device, which will be described later, so long as the coupling member can sufficiently fix the display panel 100 and the backlight unit 201 to each other.

Figure 9:
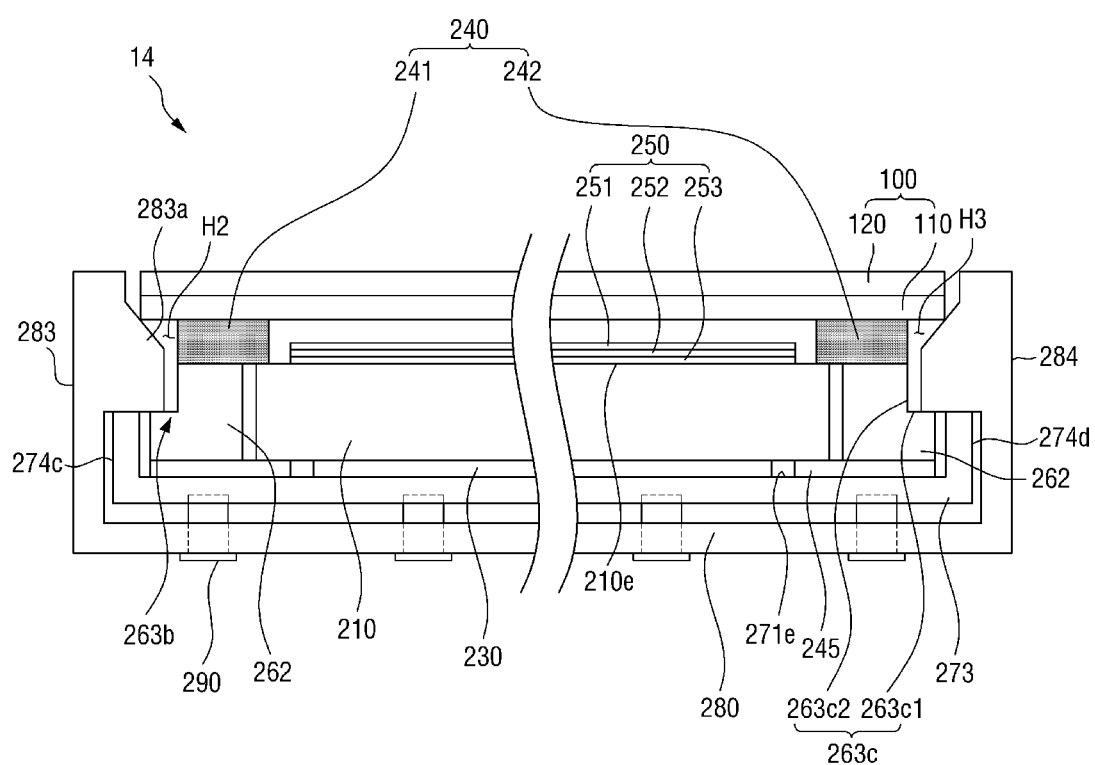
FIGS. 9 and 10 illustrate modified exemplary embodiments of the display device of FIG. 6.
Figure 10:
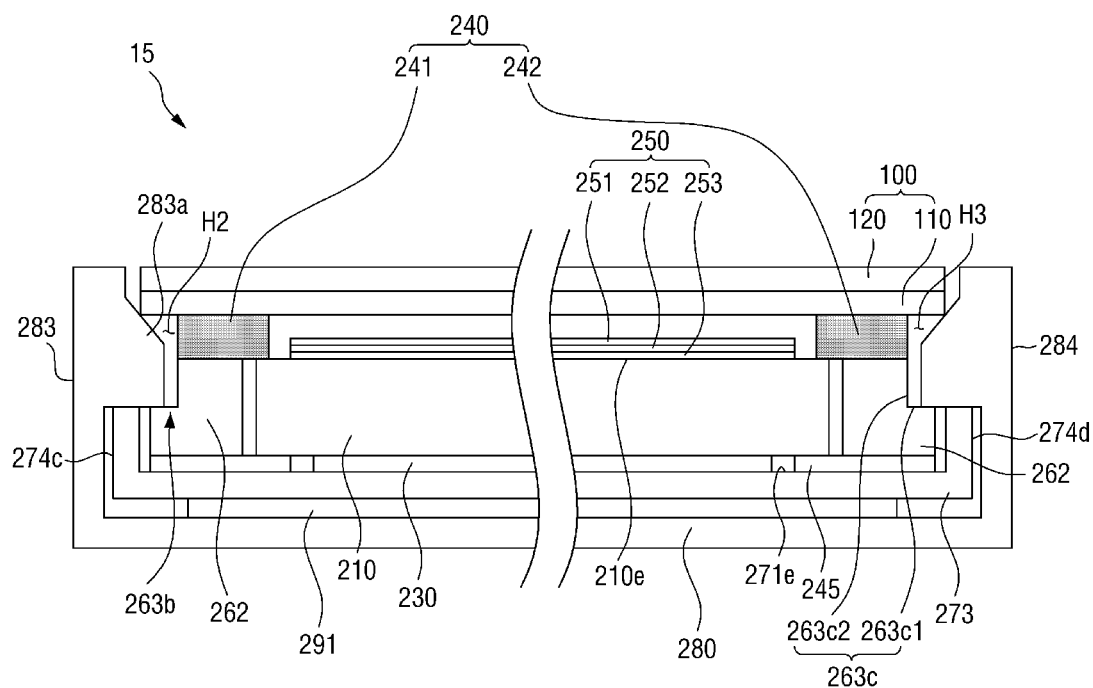

FIGS. 9 and 10 illustrate modified exemplary embodiments of the display device 13 of FIG. 6. Here, FIGS. 9 and 10 are views based on the cross section taken along line II2-II2' illustrated in FIG. 6, similar to the view of FIG. 8.

A display device 14 illustrated in FIG. 9 is different from the display device 13 illustrated in FIG. 8 in that it further includes a first coupling (or fixing) member 290 provided in plurality.

Referring to FIG. 9, the first coupling members 290 may be cylindrical screws in an embodiment. The first coupling members 290 may pass through a bottom surface of a back cover 280 to contact a bottom surface of a bottom chassis 273. In an embodiment, the bottom chassis 273 may include a groove provided in plurality to be respectively coupled to the first coupling members 290. The shape, size, and number of the first coupling members 290 are not limited to those illustrated in FIG. 9. However, since a display panel 100 and a backlight unit 201 are primarily fixed by first through third coupling portions 282*a* through 284*a* of the back cover 280, the number of the first coupling members 290 can be reduced.

A display device 15 illustrated in FIG. 10 is different from the display device 13 illustrated in FIG. 8 in that it further includes a second coupling member 291.

Referring to FIG. 10, the second coupling member 291 may be an adhesive tape in an embodiment. Here, the adhesive tape may be a foam tape or a double-sided tape.

That is, the second coupling member 291 may be disposed between a bottom surface of a back cover 280 and a bottom surface of a bottom chassis 273 to attach the bottom surface of the back cover and the bottom surface of the bottom chassis 273 to each other. The second coupling member 291 may be formed as a single piece as illustrated in FIG. 10. Alternatively, the second coupling member 291 may collectively include a plurality of adhesive tapes spaced apart from each other.

Although not illustrated in the drawing, a display device may include both the first coupling members 290 and the second coupling member 291.

According to one or more embodiments, a slimmer display device can be provided.

In addition, light leakage can be reduced or effectively prevented even with a mold frame omitted at a light incident portion of the backlight unit.

Furthermore, a back cover, a display panel and a backlight unit can be coupled to each other by a relatively simple coupling structure.

While exemplary embodiments are described above, it is not intended that these embodiments describe all possible forms of the invention of the present disclosure. Rather, the words used in the specification are words of description rather than limitation, and it is understood that various changes may be made without departing from the spirit and scope of the invention of the present disclosure. Additionally, the features of various implementing embodiments may be combined to form further exemplary embodiments of the present disclosure.

What is claimed is:

1. A display device comprising:
   a display panel which displays an image with light;
   a light guide plate which guides the light to the display panel, the light guide plate comprising a first side surface through which the light is incident to the light guide plate and a second side surface which is opposite to the first side surface;
   a light source module which is disposed along the first side surface of the light guide plate;
   a mold frame which is disposed facing the second side surface of the light guide plate, the mold frame being disconnected at the first side surface of the light guide plate along which the light source module is disposed;
   a bottom chassis in which is accommodated the light source module, the mold frame and the light guide plate, the bottom chassis comprising a first sidewall facing the first side surface of the light guide plate and an extension portion which extends from the first sidewall to overlap an upper surface of the light guide plate at the first side surface thereof at which the mold frame is disconnected;
   a first adhesive member which is disposed between the display panel and the extension portion of the bottom chassis, at the first side surface of the light guide plate; and
   a second adhesive member which overlaps the upper surface of the light guide plate and an upper surface of the mold frame.

2. The display device of claim 1, wherein
   the first adhesive member directly contacts the display panel and the extension portion of the bottom chassis, at the first side surface of the light guide plate, and
   the second adhesive member directly contacts the upper surface of the mold frame and the upper surface of the light guide plate, at the second side surface of the light guide plate.

3. The display device of claim 1, wherein at least one of the first adhesive member and the second adhesive member comprises a light shielding material.

4. The display device of claim 1, further comprising a back cover in which is accommodated the bottom chassis, the back cover comprising:
   a first sidewall facing the first side surface of the light guide plate, and
   a second sidewall facing the second side surface of the light guide plate,
   wherein a portion of the second sidewall extends toward the first side surface of the light guide plate to define a coupling portion of the back cover with which the back cover is coupled to the mold frame or the bottom chassis.

5. The display device of claim 4, wherein the mold frame comprises a receiving portion to which the coupling portion of the back cover is coupled, the receiving portion of the mold frame comprising:
   a first surface extending from an outer surface of the mold frame toward the first side surface of the light guide plate, and
   a second surface extending from the first surface of the mold frame toward the display panel,
   wherein the coupling portion of the back cover directly contacts the first surface of the receiving portion of the mold frame.

6. The display device of claim 4, wherein
   the bottom chassis further comprises a recessed portion to which the coupling portion of the back cover is coupled, the recessed portion of the bottom chassis comprising a surface extending from an outer surface of the bottom chassis toward the first side surface of the light guide plate, and
   the coupling portion of the back cover directly contacts the surface of the recessed portion of the bottom chassis.

7. The display device of claim 4, further comprising a coupling member which passes through a portion of the back cover to contact a bottom surface of the bottom chassis and fix the back cover and the bottom chassis to each other.

8. The display device of claim 4, further comprising an adhesive film which is disposed between the back cover and the bottom chassis and directly contacts the back cover and the bottom chassis to fix the back cover and the bottom chassis to each other.

9. The display device of claim 4, wherein the coupling portion which extends from the second sidewall of the back cover toward the first side surface of the light guide plate directly contacts the display panel.

10. The display device of claim 1, further comprising a third adhesive member which is disposed between the extension portion of the bottom chassis and the upper surface of the light guide plate to fix the extension portion and the light guide plate to each other at the first side surface thereof.

11. The display device of claim 1, wherein the first adhesive member disposed between the display panel and the extension portion of the bottom chassis, at the first side surface of the light guide plate, is thinner than the second adhesive member disposed between the display panel and the upper surface of the mold frame, at the second side surface of the light guide plate.

12. The display device of claim 1, wherein the display panel comprises:
 a first substrate which directly contacts the second adhesive member at the second side surface of the light guide plate,
 a second substrate opposite to the first substrate, and
 a sealing member adjacent to the second adhesive member at the second side surface of the light guide plate, the sealing member commonly directly contacting each of an end side surface of the first substrate and an end side surface of the second substrate.

13. A display device comprising:
 a display panel which displays an image with light;
 a light guide plate which guides the light to the display panel, the light guide plate comprising:
  an upper surface facing the display panel and through which light exits from the light guide plate,
  a lower surface opposite to the upper surface, and
  first through fourth side surfaces each connecting the upper and lower surfaces to each other;
 a light source disposed along the first side surface of the light guide plate;
 a mold frame on which the display panel is supported, the mold frame being disposed along the second side surface which is opposite to the first side surface of the light guide plate, along the third and fourth side surfaces of the light guide plate which are opposite to each other, and disconnected at the first side surface of the light guide plate;
 a bottom chassis in which is accommodated the light source, the mold frame and the light guide plate, the bottom chassis comprising a first sidewall facing the first side surface of the light guide plate and an extension portion which extends from the first sidewall toward the second side surface of the light guide plate;
 a first adhesive member which directly contacts the display panel and an upper surface of the extension portion of the bottom chassis, at the first side surface of the light guide plate, to fix the display panel to the extension portion; and
 a second adhesive member which directly contacts the mold frame and the display panel at the second through fourth side surfaces of the light guide plate, to fix the mold frame to the display panel.

14. The display device of claim 13, wherein the extension portion which extends from the first sidewall of the bottom chassis toward the second side surface of the light guide plate overlaps the upper surface of the light guide plate at the first side surface thereof.

15. The display device of claim 13, further comprising a back cover in which is accommodated the bottom chassis, the back cover comprising:
 a first sidewall facing the first side surface of the light guide plate,
 a second sidewall facing the second side surface of the light guide plate,
 a third sidewall facing the third side surface of the light guide plate, and
 a fourth sidewall facing the fourth side surface of the light guide plate,
 wherein a portion of the second, third or fourth sidewall extends toward the light guide plate to define a coupling portion of the back cover, with which the back cover is coupled to the mold frame or the bottom chassis.

16. The display device of claim 15, wherein the mold frame comprises a receiving portion to which the coupling portion of the back cover is coupled, the receiving portion of the mold frame comprising:
 a first surface extending from an outer surface of the mold frame toward the light guide plate, and
 a second surface extending from the first surface of the mold frame toward the display panel,
 wherein the coupling portion of the back cover directly contacts at least one of the display panel and the first surface of the receiving portion of the mold frame.

17. The display device of claim 15, wherein
 the bottom chassis further comprises a recessed portion to which the coupling portion of the back cover is coupled, the recessed portion of the bottom chassis comprising a surface extending from an outer surface of the bottom chassis toward the light guide plate, and
 the coupling portion of the back cover directly contacts the surface of the recessed portion of the bottom chassis.

18. The display device of claim 15, further comprising a coupling member which commonly directly contacts the back cover and the bottom chassis to couple the back cover to the bottom chassis,
 wherein the coupling member comprises at least one of a screw or an adhesive film.

19. The display device of claim 13, wherein at least one of the first adhesive member and the second adhesive member comprises a light shielding material.

20. The display device of claim 13, wherein the first adhesive member which directly contacts the display panel and the upper surface of the extension portion of the bottom chassis, at the first side surface of the light guide plate is thinner than the second adhesive member which directly contacts the mold frame and the display panel at the second through fourth side surfaces of the light guide plate.

* * * * *